United States Patent
Hasebe et al.

(10) Patent No.: US 7,000,943 B2
(45) Date of Patent: Feb. 21, 2006

(54) AIRBAG AND AIRBAG SYSTEM

(75) Inventors: Masahiro Hasebe, Hikone (JP); Yukitoshi Narimoto, Omihachiman (JP)

(73) Assignee: Takata Corporation, Tokyo (JP)

( * ) Notice: Subject to any disclaimer, the term of this patent is extended or adjusted under 35 U.S.C. 154(b) by 259 days.

(21) Appl. No.: 10/724,152

(22) Filed: Dec. 1, 2003

(65) Prior Publication Data

US 2004/0164526 A1 Aug. 26, 2004

(30) Foreign Application Priority Data

Feb. 26, 2003 (JP) ............................. 2003-049535

(51) Int. Cl.
*B60R 21/24* (2006.01)
(52) U.S. Cl. ............... 280/729; 280/743.2; 280/732
(58) Field of Classification Search ............... 280/729, 280/732, 743.2, 743.1, 730.1; B60R 21/24
See application file for complete search history.

(56) References Cited

U.S. PATENT DOCUMENTS

| | | | |
|---|---|---|---|
| 3,752,501 A * | 8/1973 | Daniel et al. ............... 280/729 |
| 3,792,873 A | 2/1974 | Buchner et al. |
| 5,213,361 A | 5/1993 | Satoh et al. |
| 5,358,273 A * | 10/1994 | Onishi et al. ............ 280/743.1 |
| 5,934,701 A | 8/1999 | Furukawa |
| 5,941,559 A * | 8/1999 | Rudolf et al. .............. 280/729 |
| 6,595,549 B1 * | 7/2003 | Bohn et al. ............. 280/743.1 |
| 6,802,534 B1 | 10/2004 | Neupert |
| 6,834,884 B1 * | 12/2004 | Gu ............................... 280/729 |
| 6,834,886 B1 * | 12/2004 | Hasebe et al. ........... 280/743.1 |
| 6,857,659 B1 * | 2/2005 | Webber .................... 280/743.2 |
| 6,883,832 B1 * | 4/2005 | Keutz ....................... 280/743.2 |
| 6,913,283 B1 * | 7/2005 | Heym ........................ 280/732 |
| 2002/0084641 A1 * | 7/2002 | Fellhauer et al. ........ 280/743.1 |
| 2003/0218325 A1 * | 11/2003 | Hasebe et al. ........... 280/743.2 |

FOREIGN PATENT DOCUMENTS

| | | |
|---|---|---|
| JP | 47-2361 | 2/1972 |
| JP | 47-21783 | 7/1972 |
| JP | 47-30044 | 11/1972 |
| JP | 47-30045 | 11/1972 |
| JP | 49023176 B | 6/1974 |
| JP | 3-32956 | 2/1991 |
| JP | 4-9349 | 1/1992 |
| JP | 4-55141 | 2/1992 |
| JP | 4-201644 | 7/1992 |
| JP | 4-292239 | 10/1992 |
| JP | 5-178146 | 7/1993 |
| JP | 7-285408 | 10/1995 |

* cited by examiner

*Primary Examiner*—Paul N. Dickson
(74) *Attorney, Agent, or Firm*—Manabu Kanesaka

(57) ABSTRACT

An airbag is inflated with gas ejected from an inflator disposed at a base end thereof in a direction that a front end moves away from the base end. The airbag includes a left half airbag to be inflated on a front left side of an occupant and a right half airbag to be inflated on a front right side of the occupant. A partition wall is disposed in the airbag for dividing the airbag into a base end portion and a front end portion. The partition wall has openings for communicating the base end portion and the front end portion with each other.

17 Claims, 11 Drawing Sheets

AIRBAG AND AIRBAG SYSTEM

The present invention relates to an airbag and an airbag system for protecting an occupant in case of a car crash and the like. More particularly, the present invention relates to an airbag and an airbag system including a left half airbag and a right half airbag to be inflated at a front left side and a front right side of an occupant, respectively.

Japanese Patent Publication (Kokai) No. 04-292239 has disclosed an airbag for protecting an occupant in case of a car crash and the like. The airbag includes a left half airbag and a right half airbag to be inflated by a common inflator on a front left side and a front right side of the occupant, respectively. In the airbag, front ends of the left half airbag and the right half airbag are joined together with a tie panel.

The airbag is housed in a casing in a folded state and covered with a cover. When the inflator (gas generator) is activated to eject gas in case of a car crash, the airbag pushes the cover to open, and is inflated in front of the occupant. The inflator is disposed at an inside or outside of a base end of the airbag. When an airbag system has the inflator at the outside of the base end of the airbag, the gas from the inflator is supplied into the airbag through a gas inlet at the base end of the airbag. When the inflator is arranged at the inside of the base end of the airbag, an entire portion or a part of the inflator may be disposed in the airbag. The latter example includes a structure in which a pair of slit openings is provided in the airbag for inserting a rod-like inflator, and both ends of the inflator project to the exterior of the airbag.

In the airbag disclosed in Japanese Patent Publication (Kokai) No. 04-292239, the left half airbag and the right half airbag are single-piece hollow chambers from the base end to the front end. Accordingly, the base end and the front end of the airbag are inflated substantially at the same time. Also, the front ends of the left half airbag and the right half airbag are connected together with a tie panel. Accordingly, when the airbag is inflated, the tie panel receives a lateral center of the occupant body.

In the airbag disclosed in Japanese Patent Publication (Kokai) No. 04-292239, when the left half airbag and the right half airbag are inflated, the gas from the inflator may flow in one of the half airbags more than the other, and the one of the half airbags is inflated faster than the other of the half airbags. In the airbag, the left half airbag and the right half airbag are joined with the tie panel. Accordingly, even if the other of the half airbags is inflated later, it is possible that the one of the half airbags pulls the other of the half airbags in the direction of inflation through the tie panel to facilitate the inflation. The tie panel, however, joins the front ends of the left half airbag and the right half airbag. Therefore, the one of the half airbags can sufficiently pull the other of the half airbags through the tie panel only after the front end is fully inflated.

In view of the problems described above, the present invention has been made, and an object of the present invention is to provide an airbag and an airbag system in which the base end and the front end are divided and the base end inflates faster than the front end.

Another object of the present invention is to provide an airbag and an airbag system in which the left half airbag receives a left thorax of the occupant and the right half airbag receives a right thorax, and the space between the half airbags faces the lateral center of the thorax of the occupant.

A further object of the present invention is to provide an airbag and an airbag system in which both of the left half airbag and the right half airbag are inflated smoothly and substantially symmetrically from the early stage of inflation.

Further objects and advantages of the invention will be apparent from the following description of the invention.

SUMMARY OF THE INVENTION

According to the present invention, an airbag is inflated with gas ejected from an inflator disposed at a base end thereof in a direction that a front end moves away from the base end. The airbag includes a left half airbag to be inflated on a front left side of an occupant and a right half airbag to be inflated on a front right side of the occupant. The airbag has a partition wall for dividing the airbag into a base end portion and a front end portion. The partition wall has an opening for communicating the base end portion and the front end portion with each other.

In the present invention, when the inflator is activated, the base end portion is inflated first, and then the front end portion is inflated. The base end portion contacts a component of a vehicle such as an instrument panel to be in a stable position, so that the front end of the airbag is stabilized during the inflation as well as after the inflation.

According to the present invention, when the left half airbag and the right half airbag have different capacities, the half airbag having a larger capacity may have a partition wall having a larger opening. Accordingly, it is possible to inflate the left half airbag and the right half airbag substantially at the same time.

According to the present invention, the airbag may include closing means for closing the opening of the partition wall until a gas pressure in the base end portion reaches a predetermined level, thereby facilitating the inflation of the base end. The closing means may be a tear seam having a simple configuration.

According to the present invention, the partition wall may be connected to the half airbag at an upper position and a lower portion thereof, and the upper position is located closer to the base end than the lower portion. When an airbag system having the airbag with such an arrangement is inflated above an upper surface of the instrument panel, the base end contacts the upper surface of the instrument panel over a large area, thereby securely stabilizing the base end of the airbag.

According to another aspect of the present invention, the airbag is inflated with gas ejected from an inflator disposed at a base end thereof in a direction that a front end moves away from the base end. The airbag includes a left half airbag to be inflated on a front left side of an occupant and a right half airbag to be inflated on a front right side of the occupant. The airbag has partition means for dividing the airbag into a base end portion and a front end portion. The partition means is arranged to open when a gas pressure in the base end portion reaches a predetermined level.

In the invention, when the inflator is activated, the base end portion is inflated first, and then the front end portion is inflated. The base end portion contacts a component of a vehicle such as an instrument panel to be in a stable position, so that the front ends of the airbag are stabilized during the inflation as well as after the inflation. The partition means may be a tear seam having a simple configuration.

According to the present invention, the front ends of the left half airbag and the right half airbag may be separated, and a space facing the occupant is formed between the front ends of the left half airbag and the right half airbag when the airbag is inflated.

In the invention, when the airbag with such an arrangement is inflated, the left half airbag receives a left thorax of the occupant and the right half airbag receives a right thorax of the occupant. The thorax portion has hard strong ribs. The airbag receives and absorbs an impact to the occupant through the ribs. The airbag has the space between the front ends of the left half airbag and the right half airbag in the inflated state. The space faces a vicinity of breastbones of the occupant at the center thereof. Accordingly, when the body of the occupant plunges into the airbag, the vicinity of the breastbones does not receive a large reaction force of the airbag, thereby decreasing a load on the breastbones.

According to the present invention, the left half airbag and the right half airbag may be spaced at the front ends thereof by a distance from 150 mm to 350 mm when the airbag is inflated. Accordingly, the left half airbag faces around the center of the left thorax and the right half airbag faces around the right thorax, thereby securely receiving the ribs of the upper body of the occupant.

According to the present invention, a common inflator may be used for inflating the left half airbag and the right half airbag. Accordingly, it is possible to reduce the number of the inflators and a production cost.

According to the present invention, the left half airbag and the right half airbag may be connected at intermediate portions thereof in the direction of the inflation. When the left half airbag and the right half airbag are connected at the intermediate portions thereof, even if one of the half airbags is inflated later during the inflation of the airbag, the other of the half airbags pulls the one of the half airbags to facilitate the inflation. Further, the other of the half airbags starts to pull the one of the half airbags in the direction of the inflation from an early stage when the other of the half airbags is inflated up to the intermediate portion. Therefore, the left half airbag and the right half airbag are inflated smoothly and substantially symmetrically from the early stage of the inflation.

According to the present invention, the left and the right half airbags may be formed of a plurality of panels. The panels are joined at connecting portions arranged at an outside of the airbag at the intermediate portions of the half airbags in the direction of the inflation. The connecting portions are arranged at the intermediate portions where the left half airbag and the right half airbag face each other, and may be connected with each other. Accordingly, it is possible to omit a tie panel for connecting the left half airbag and the right half airbag together, thereby reducing a cost of producing the airbag.

According to the present invention, the airbag may further includes restricting means such as a tether for restricting widths of the left half airbag and right half airbag in the inflated state to decrease a capacity of the airbag. Accordingly, it is possible to completely inflate the airbag at an early stage with a low-capacity inflator.

According to the present invention, the airbag is arranged so that the base end portion is inflated toward the occupant along the upper surface of the instrument panel. When the airbag is inflated, a front lower portion of the base end portion in the direction of the inflation projects toward the occupant further from a rim of the upper surface of the instrument panel. With such an arrangement, the base end portion of the airbag wraps around and contacts a front portion of the instrument panel, thereby stabilizing the base end portion during the inflation. The airbag may be arranged so that the base end portion thereof projects toward the occupant from the rim of the upper surface of the instrument panel by a length of 150 mm or less.

According to the present invention, an airbag system is provided with one of the airbags described above.

DETAILED DESCRIPTION OF PREFERRED EMBODIMENTS

Figure 1A:
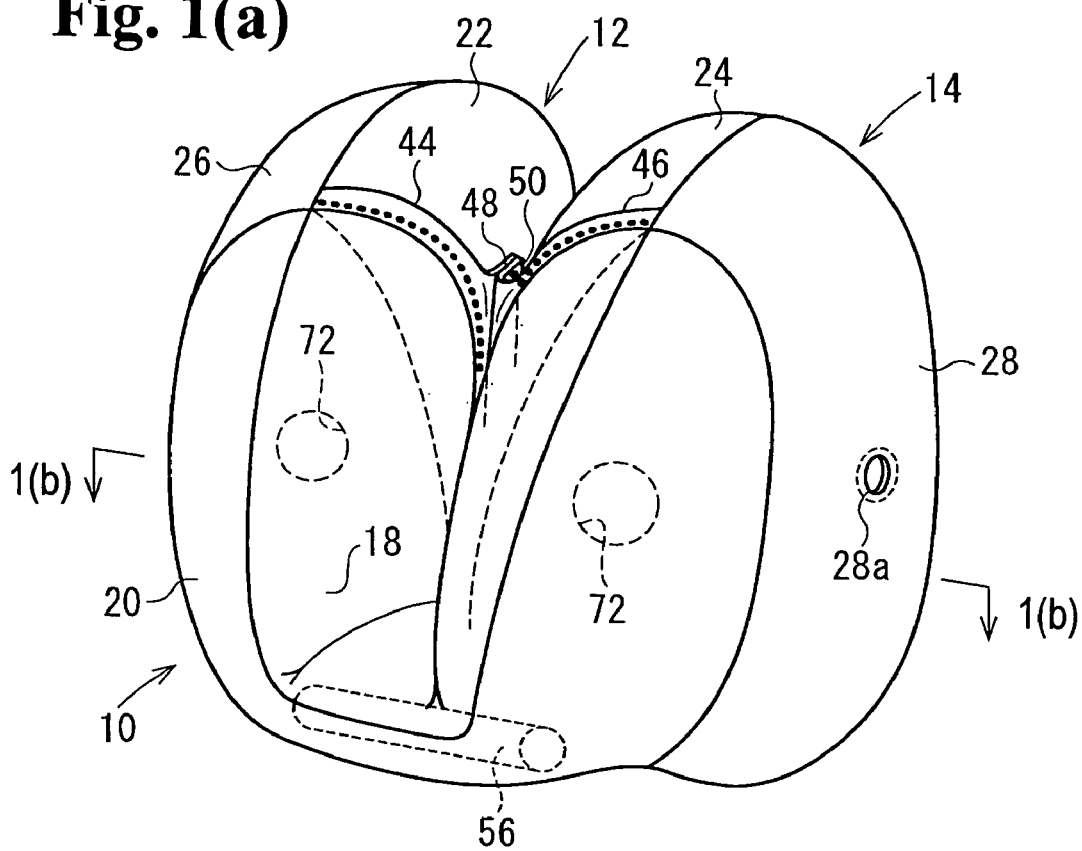
FIGS. 1(*a*) and 1(*b*) are views of an airbag according to an embodiment of the present invention, wherein FIG. 1(*a*) is a perspective view of the airbag in an inflated state, and FIG. 1(*b*) is a sectional view of the airbag taken along line 1(*b*)—1(*b*) in FIG. 1(*a*)

Hereunder, embodiments of the present invention will be described with reference to the accompanying drawings. FIG. 1(*a*) is a perspective view of an airbag 10 in an inflated state according to an embodiment, and FIG. 1(*b*) is a sectional view of the airbag in FIG. 1(*a*) taken along line 1(*b*)—1(*b*) in FIG. 1(*a*). FIG. 2 is a sectional view of the airbag taken along line 2—2 in FIG. 1(*b*). FIG. 3(*a*) is an exploded perspective view of the airbag, and FIG. 3(*b*) is an enlarged view of a part 3(*b*) in FIG. 3(*a*). FIG. 4 is a side view of the airbag in an inflated state in a vehicle chamber.

The airbag 10 includes a right half airbag 12 to be inflated on a front right side of an occupant, a left half airbag 14 to be inflated on a front left side of the occupant, and a communicating section 16 for communicating one end of the right half airbag 12 with one end of the left half airbag 14.

The communicating section 16 is a base end of the airbag 10. Therefore, the right half airbag 12 and the left half airbag 14 are inflated in a direction away from the connecting section 16.

The airbag 10 has a partition panel 70 therein for partitioning each of the right half airbag 12 and the left half airbag 14 into a base end portion (adjacent to the communicating section 16) and front end portions. The partition panel 70 has two openings 72 for communicating the base end portion and the front end portion of the right half airbag 12, and the base end portion and the front end portion of the left half airbag 14, respectively. In accordance with the embodiment, the right half airbag 12 and the left half airbag 14 have a substantially equal volume, and the openings 72 communicating the base end portion with the front end portions of the right half airbag 12 and the left half airbag 14 have a substantially equal opening area.

The partition panel 70 partitions the airbag 10 to form a base-end chamber 17 including the respective base end portions of the right half airbag 12 and the left half airbag 14 and the communicating section 16.

According to the embodiment, as shown in FIG. 4, the base-end chamber 17 is inflated toward the occupant along an upper surface of an instrument panel 1. A front lower portion at an end of the base-end chamber 17 in a direction of the inflation is expanded toward the occupant further from an edge of the upper surface of the instrument panel 1 (an edge adjacent to the occupant). With such an arrangement, the lower surface of the base-end chamber 17 contacts the upper surface of the instrument panel 1 to significantly stabilize the base-end chamber 17 during the inflation. The front lower portion at the end of the base-end chamber 17 projects from the edge of the instrument panel 1 by a length of preferably 150 mm or less in the inflated state.

During the inflation of the airbag 10, the front ends of the right half airbag 12 and the left half airbag 14 have no connecting member such as a tie panel therebetween. Accordingly, a space 13 is formed between the front ends of the half airbags 12 and 14 to face the occupant (upward in FIG. 1(b)). When the airbag 10 is fully inflated, a space W between a front end 12t of the right half airbag 12 and a front end 14t of the left half airbag 14 is preferably 150 mm to 350 mm, more preferably, 170 mm to 330 mm. In the airbag 10, the right half airbag 12 and the left half airbag 14 are joined together at intermediate portions thereof with a seam 52 in the direction of the inflation.

According to the embodiment, the airbag 10 is formed of panels 18, 20, 22, 24, 26, 28, and 70 through stitching the panels together. A stitching structure of the panels will be described hereinafter. As shown in FIG. 3(a), the panel 18 (rear inner panel) forms a center surface of the airbag 10 including rear end portions (base end portions) of the right half airbag 12 and the left half airbag 14 from the intermediate portions in the direction of the inflation, and the communicating section 16. The panel 20 (rear outer panel) forms a surface opposite to the rear inner panel 18 (outer surface of the airbag 10).

The panels 22 and 24 (front inner panels) form surfaces of the right half airbag 12 and the left half airbag 14 at the center of the airbag 10 toward the front ends from the intermediate portions in the direction of the inflation (opposing surfaces of the right half airbag 12 and the left half airbag 14). The panels 26 and 28 (front outer panels) form surfaces opposite to the front inner panels 22 and 24 (outer surfaces of the airbag 10), respectively.

Numeral 30 denotes a seam stitching the rear inner panel 18 and the rear outer panel 20 together; numerals 32 and 34 indicate seams stitching the rear inner panel 18 and the front inner panels 22 and 24 together, respectively; and numeral 36 and 38 represent seams stitching the rear outer panel 20 and the front outer panels 26 and 28 together, respectively.

The panel 70 (partition panel) partitions the right half airbag 12 and the left half airbag 14 into the respective base ends and front ends, as described above. In the embodiment, the partition panel 70 has substantially a shape same as that of the rear outer panel 20. In making the airbag 10, the partition panel 70 is overlapped on an inner surface of the rear outer panel 20 (surface facing the interior of the airbag product), and a periphery thereof is stitched to the rear outer panel 20 with the seams 30, 36 and 38. A space between the partition panel 70 and the rear outer panel 20 is the base-end chamber 17.

Figure 1B:
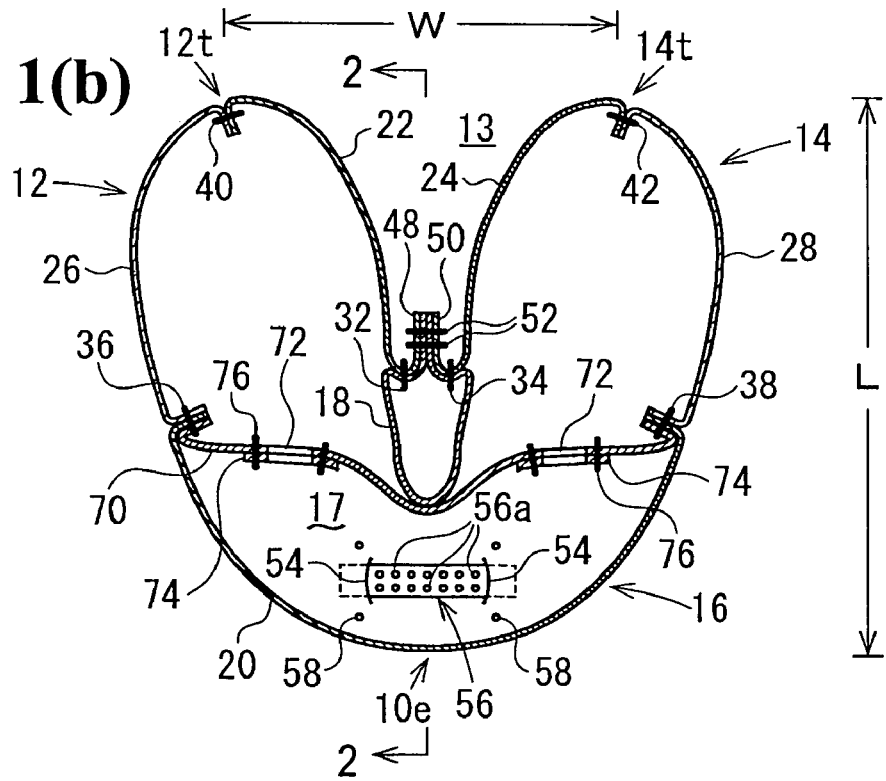
Figure 2:
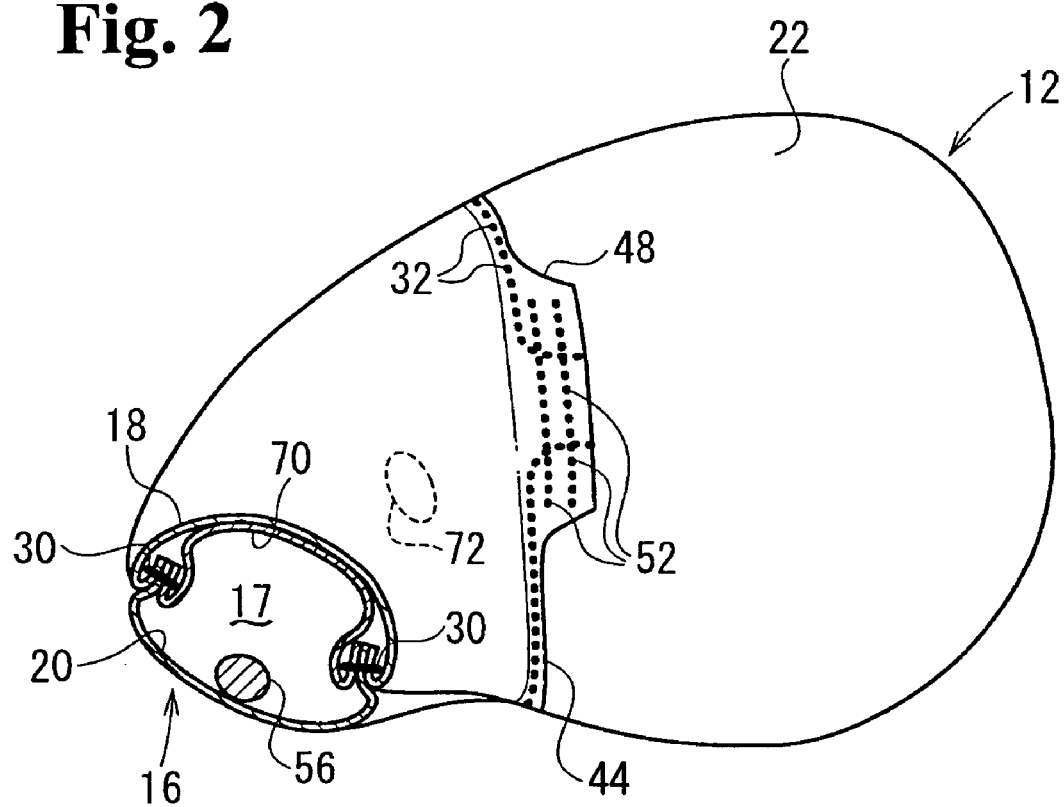
FIG. 2 is a sectional view of the airbag taken along line 2—2 in FIG. 1(*b*)
Figure 3A:
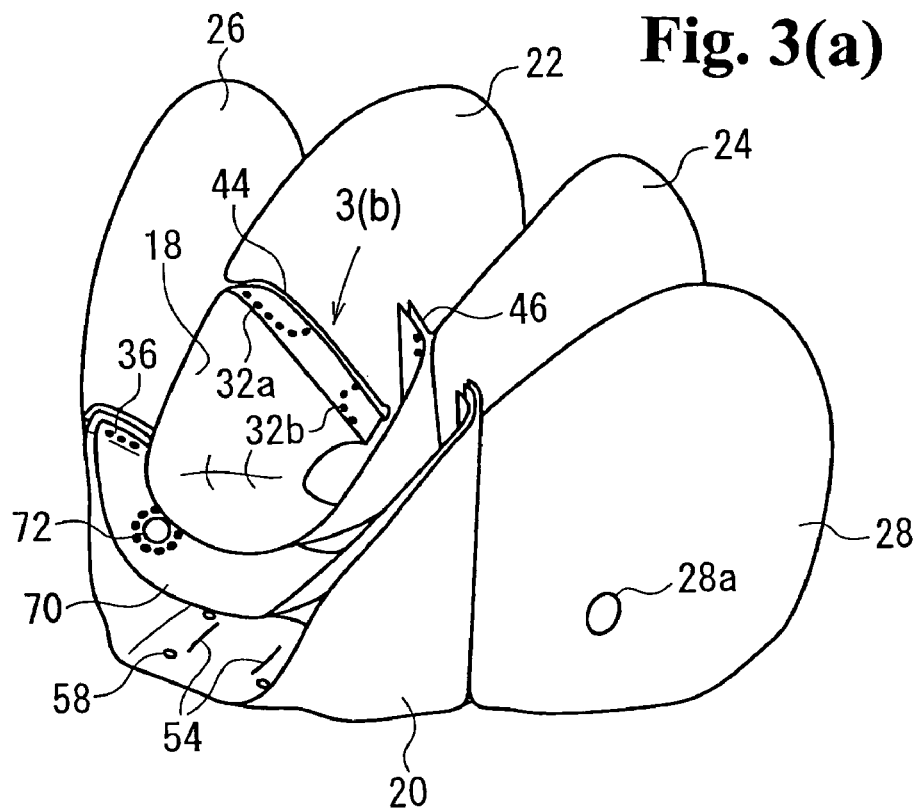
FIG. 3(*a*) is an exploded perspective view of the airbag of FIG. 1(*a*), and FIG. 3(*b*) is an enlarged view of an essential part of the airbag.

As shown in FIGS. 1(b) and 2, when the base-end chamber 17 is inflated, the partition panel 70 closely contacts an inner surface of the rear inner panel 18 at a crotch between the right half airbag 12 and the left half airbag 14. Accordingly, the gas does not flow between the right half airbag 12 and the left half airbag 14.

In the embodiment, a reinforcing patch 74 is adhered to a periphery of each opening 72 of the partition panel 70. Reference numeral 76 indicates a seam for stitching the patch 74 to the periphery of each opening 72. Reference numeral 28a denotes a left half airbag vent hole provided in the front outer panel 28. The front outer panel 26 also has a similar right half airbag vent hole (not shown).

As shown in FIG. 1(a), respective seam allowances 44 and 46 for the rear inner panel 18 and the front inner panels 22 and 24 are arranged to be exposed from the outer surfaces of the right half airbag 12 and the left half airbag 14. As shown in FIGS. 1(b) and 2, tongue-shaped connecting allowances 48 and 50 (only the connecting allowance 48 is shown in FIG. 2) project from the seam allowances 44 and 46. As shown in FIG. 1(b), the connecting allowances 48 and 50 are stitched together with a seam 52. Accordingly, the right half airbag 12 and the left half airbag 14 are connected at the intermediate portions of the opposed surfaces thereof in the direction of the inflation through the respective seam allowances 44 and 46 of the rear inner panel 18 and the front inner panels 22 and 24.

A distance from the rear end 10e of the airbag 10 to the seam 52 in the inflated state is preferably 30 percent to 70 percent, more particularly about 40 percent to 55 percent, of a longitudinal length L of the inflated airbag 10.

The rear outer panel 20 facing the base-end chamber 17 has a pair of slits 54 for inserting an inflator. As shown in FIGS. 1(a) and 1(b), the embodiment includes a rod-shaped inflator 56. The rod-shaped inflator 56 is inserted in the slits 54 to pass through the communicating section 16 in a width direction of the vehicle. Both ends of the inflator 56 are arranged outside the airbag 10. As shown in FIG. 1(b), gas ports 56a of the inflator 56 are disposed in the base-end chamber 17.

The airbag 10 is mounted to a passenger-side airbag system for protecting a passenger in the vehicle during a car crash. As shown in FIG. 4, the airbag system includes an open-top box-shaped casing 2 for housing the airbag 10. The airbag 10 is connected to the casing 2. Reference numeral 58 in FIG. 1(b) indicates a hole for inserting a fastener (not shown) such as a bolt for connecting the airbag 10 with the casing 2. The both ends of the inflator 56 are also fixed in the casing 2.

The airbag 10 is housed in the casing 2 in a folded state and a lid 3 is mounted to the casing 2 to cover the folded airbag 10, thereby forming the airbag system. The lid 3 is torn to open by the pressure of the airbag 10 when the airbag 10 is inflated.

The airbag system is mounted in an airbag-system installation opening on the upper surface of the instrument panel 1 in front of the front passenger seat of the car. Reference numeral 4 denotes a windshield. In this embodiment, the lid 3 extends to become substantially flush with the upper surface of the instrument panel 1 and closes the airbag-system installation opening.

In the airbag system, the inflator 56 is activated to eject gas into the base-end chamber 17 in case of a car crash. The gas from the inflator 56 first inflates the base-end chamber 17 and then flows into the respective front-end chambers of the right half airbag 12 and the left half airbag 14 through the openings 72 of the partition panel 70 to inflate the respective front end portions of the right half airbag 12 and the left half airbag 14 on the front right and front left sides of the occupant.

When the airbag 10 is inflated, the base-end chamber 17 contacts the instrument panel 1 to be in a stable position. Therefore, the respective front ends of the right half airbag 12 and the left half airbag 14 become stable not only after the inflation but also during the inflation.

In the embodiment, the base-end chamber 17 is inflated along the upper surface of the instrument panel 1, and in the inflated state, a lower front end portion of the base-end chamber 17 in the direction of the inflation further projects from an edge of the upper surface of the instrument panel 1 toward the occupant. Accordingly, the lower surface of the base-end chamber 17 contacts the upper surface of the instrument panel 1 to stabilize the base-end chamber 17 during the inflation.

In the airbag 10, when the right half airbag 12 and the left half airbag 14 are inflated from the housed folded state, and one of the right half airbag 12 and the left half airbag 14 is inflated faster than the other, the one of the half airbags pulls the other to facilitate the inflation since the right half airbag 12 and the left half airbag 14 are connected together.

Moreover, the right half airbag 12 and the left half airbag 14 are joined together at the intermediate portions in the direction of the inflation with the seam 52. Accordingly, the one of the half airbags starts to pull the other in the direction of the inflation from a relatively early stage of the inflation. Therefore, both the right half airbag 12 and the left half airbag 14 are inflated smoothly and substantially symmetrically from the early stage of the inflation.

When the airbag 10 is fully inflated, the space 13 is formed between the right half airbag 12 and the left half airbag 14, and faces the occupant. The right half airbag 12 receives the right thorax of the occupant, the left half airbag 14 receives the left thorax, and the space 13 faces the vicinity of the breastbones. Therefore, it is possible to reduce a force applied to the breastbones when the occupant plunges into the airbag.

A process of producing the airbag 10 will be described next. As shown in FIG. 3(a), the partition panel 70 is first superposed on the rear outer panel 20, and the superposed panels and the front outer panels 26 and 28 are stitched together with the seams 36 and 38. At that time, the rims of the rear outer panel 20, the partition panel 70, and the front outer panel 26 are stitched together, and the rims of the rear outer panel 20, the partition panel 70, and the front outer panel 28 are stitched together in three layers with the seams 36 and 38, respectively.

The rear inner panel 18 and the front inner panels 22 and 24 are stitched together with the seams 32 and 34, respectively. The seam allowances 44 and 46 of the rear inner panel 18 and the front inner panels 22 and 24 are arranged at an outside of the airbag product.

Figure 3B:
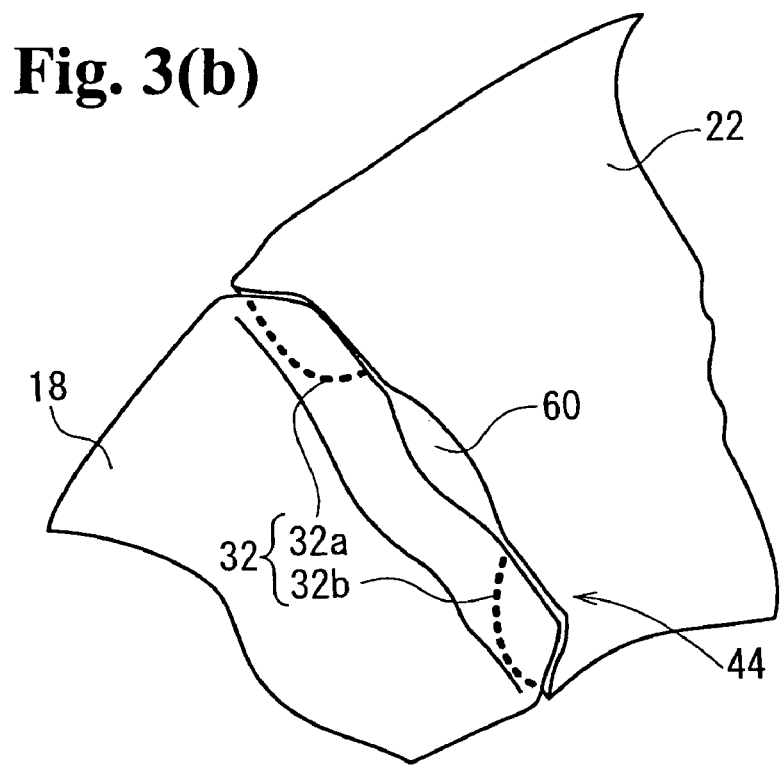
Figure 4:
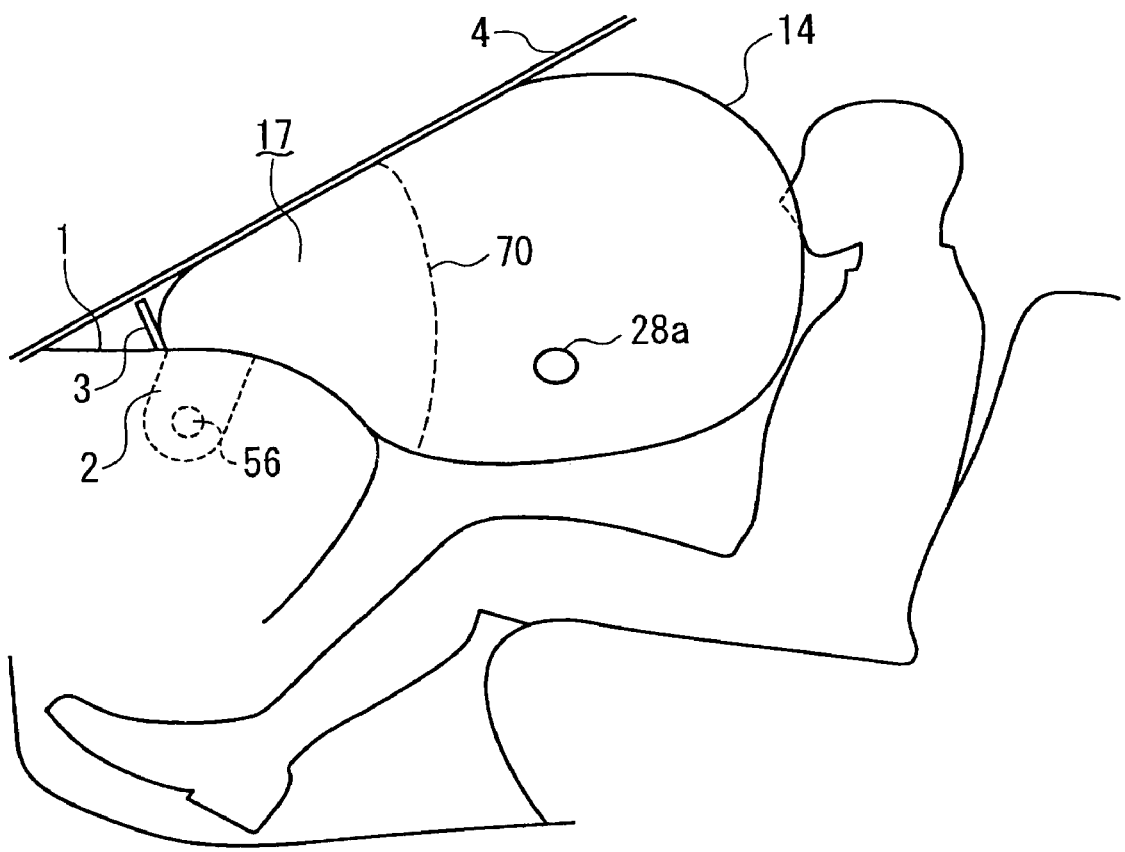
FIG. 4 is a side view of the airbag in FIG. 1(*a*) in an inflated state in a vehicle.

In this embodiment, as shown in FIG. 3(b), only opposite ends of the seam allowance 44 of the rear inner panel 18 and the front inner panel 22 are stitched together with the seam 32 (32a and 32b), respectively. A portion between the seams 32a and 32b is formed in an opening 60 for reversing the airbag.

The stitched body of the rear inner panel 18, the partition panel 70, and the front inner panels 22 and 24 is superposed on the stitched body of the rear outer panel 20 and the front outer panels 26 and 28 such that the surfaces exposed to the exterior of the airbag product are opposed. Then, the stitched bodies are stitched together at the peripheries thereof with seams 30, 40, and 42. The peripheries in which the rear inner panel 18, the partition panel 70, and the rear outer panel 20 overlap are stitched together in three layers with the seam 30. Accordingly, a reversed airbag intermediate product is produced.

The airbag intermediate product is turned inside out through the opening 60 at the seam allowance 44. The respective connecting allowances 48 and 50 of the seam allowances 44 and 46 are stitched together with the seam 52 to finish the airbag 10. When the connecting allowances 48 and 50 are stitched together, the opening 60 is closed with the seam 52.

As described above, the airbag 10 is formed of a plurality of the panels, so that the airbag 10 having a large and complicated outer surface can be produced effectively with the panels having relatively small-areas.

In this embodiment, the right half airbag 12 and the left half airbag 14 are joined together such that the respective seam allowances 44 and 46 of the rear inner panel 18 and the front inner panels 22 and 24 are stitched together. Therefore, it is not necessary to use a tie panel for connecting the right half airbag 12 and the left half airbag 14 in addition to the panels 18, 22, and 24, thereby reducing a production cost of the airbag 10.

In the embodiment, the inflator 56 is arranged in the communicating section 16 such that the rear outer panel 20 of the communicating section 16 has a pair of slits 54 as inflator openings, and the rod-shaped inflator 56 is inserted into the slits 54. As the inflator openings have the slit shape, the inflator 56 is firmly connected to the airbag 10. Also, the seam allowance 44 is provided with the opening 60 for reversing the airbag product in the process of producing the airbag, as described above. Accordingly, even if the airbag intermediate product is difficult to turn inside out through the vent hole or the inflator opening, and particularly, even when the inflator openings have the slit shape as in the embodiment, the airbag intermediate product can be easily turned inside out through the opening 60.

The opening 60 is closed with the seam 52 when the connecting allowances 48 and 50 are stitched together. Accordingly, the gas guided from the inflator 56 to the right half airbag 12 and the left halt airbag 14 does not leak from the opening 60.

Figure 5A:
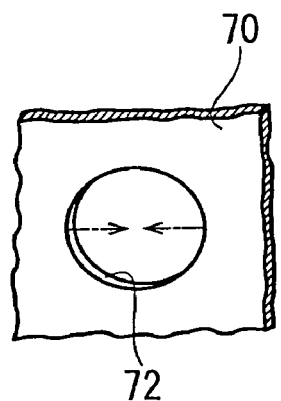
FIGS. 5(*a*) and 5(*b*) are views of a partition panel according to an embodiment, wherein FIG. 5(*a*) shows an opening of the partition panel in an open state, and FIG. 5(*b*) shows the opening of the partition panel in a closed state.
Figure 5B:
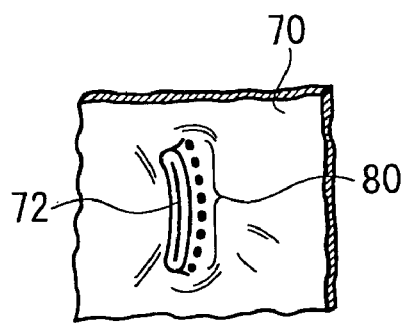
Figure 6:
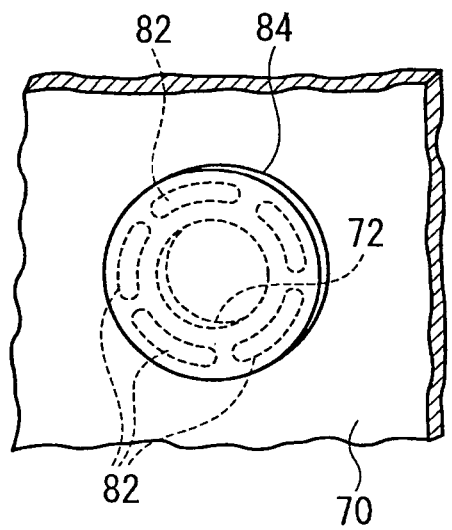
FIG. 6 is a view of a partition panel having an opening in a closed state according to another embodiment.

In the invention, the openings 72 communicating the base-end chamber 17 with the respective front end portions of the right half airbag 12 and the left half airbag 14 may be closed until an inner pressure of the base-end chamber 17 reaches a predetermined level. FIGS. 5(a), 5(b) and 6 are perspective views showing the opening 72 of the partition panel 70 to be closed according to other embodiments. FIG. 5(a) shows the opening 72 in an open state, and FIGS. 5(b) and 6 show the opening 72 in a closed state.

As shown in FIGS. 5(a) and 5(b), peripheries of the opening 72 of the partition panel 70 facing in a radial direction are superposed on each other and stitched together with a tear seam 80 to close the opening 72. When the inner pressure of the base-end chamber 17 reaches a predetermined level, the tear seam 80 is torn by the tension to separate the periphery of the opening 72 to open the opening 72.

As shown in FIG. 6, a patch 84 is bonded to the partition panel 70 with a removable adhesive 82 so as to be superposed on the opening 72, thereby closing the opening 72. The patch 84 is disposed in each of the front end portions of the right half airbag 12 and the left half airbag 14. When the inner pressure of the base-end chamber 17 reaches a predetermined level, the adhesive 82 allows the patch 84 to peel off from the surface of the partition panel 70 by the pressure applied to the patch 84 from the base-end chamber 17 through the opening 72.

As shown in FIGS. 5(a), 5(b) and 6, the openings 72 communicating the base-end chamber 17 with the respective front end portions of the right half airbag 12 and the left half airbag 14 are closed until the inner pressure of the base-end chamber 17 reaches a predetermined level, so that the base-end chamber 17 can be inflated early.

In the embodiment shown in FIGS. 5(a) and 5(b), the periphery of the opening 72 may be bonded together with a removable adhesive similar to the adhesive 82 instead of the tear seam 80, or alternatively, with other bonding means. In the embodiment shown in FIG. 6, the patch 84 may be sewn on the partition panel 70 with a tear seam instead of the adhesive 82, or alternatively, with other bonding means. Although the adhesive 82 is applied to the periphery of the opening 72 as indicated by broken line in FIG. 6, the adhesive 82 may be applied in any other ways.

Figure 7:
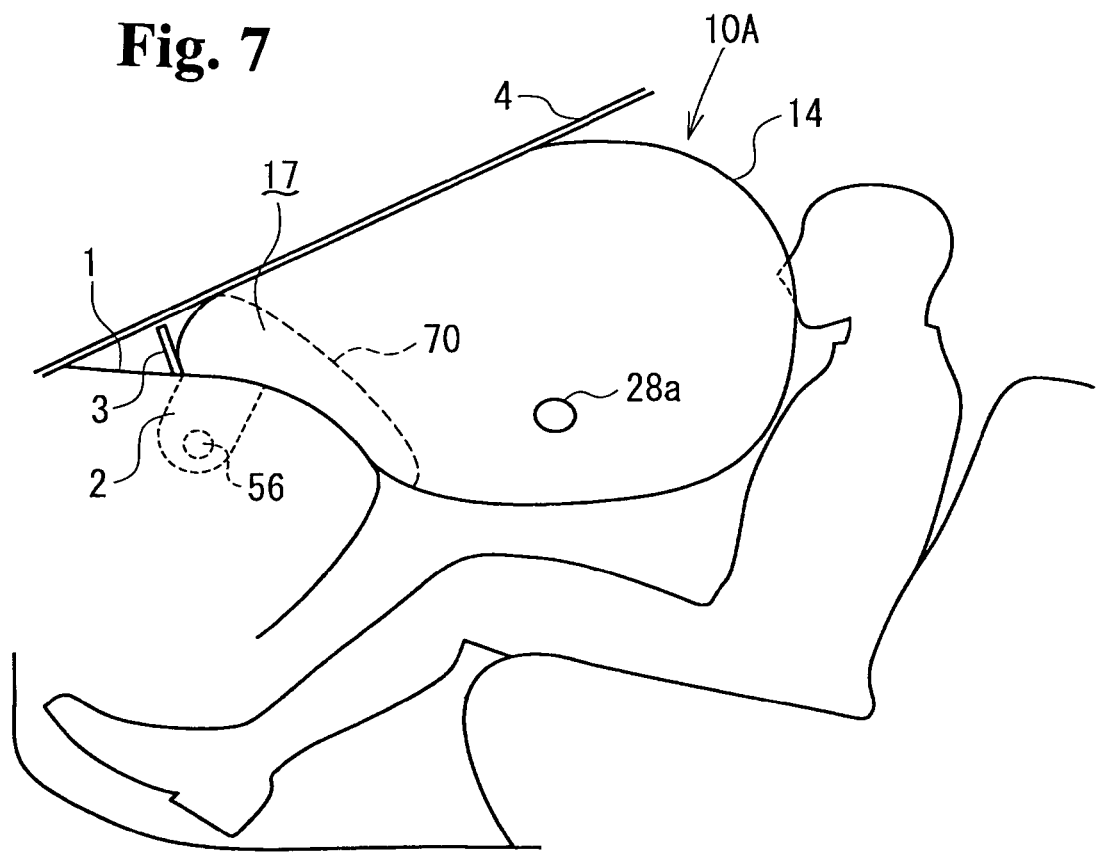
FIG. 7 is a side view of an airbag according to a further embodiment in an inflated state in a vehicle.

In the airbag 10, as shown in FIG. 4, an upper part and a lower part of the partition panel 70 are arranged substantially equally apart from the base ends of the right half airbag 12 and the left half airbag 14 in the direction of the inflation of the base-end chamber 17. Alternatively, as shown in FIG. 7, the lower part of the partition panel 70 may be arranged further away from the base end than the upper part. With such an arrangement, even if a volume of the base end is small, the base-end chamber 17 can contact the instrument panel 1 in a large area, thereby stabilizing the base-end chamber 17.

FIG. 7 is a side view of an airbag 10A with such an arrangement in a state similar to that in FIG. 4. The airbag 10A is similar to the airbag 10 shown in FIGS. 1(a) to 4 except that the lower part of the partition panel 70 is away from the base end of the right half airbag 12 or the left half airbag 14 further relative to the upper end thereof. In FIG. 7, the numerals same as those in FIGS. 1(a) to 4 denote the same components.

In the airbag 10A, the base-end chamber 17 is inflated along the upper surface of the instrument panel 1 toward the occupant. In the inflated state, the lower front end of the base-end chamber 17 in the direction of the inflation (the lower part of the partition panel 70) further projects from the edge of the upper surface of the instrument panel 1 toward the occupant. With such an arrangement, the lower surface of the inflated base-end chamber 17 contacts the upper surface of the instrument panel 1, thereby stabilizing the base-end chamber 17 during the inflation.

Figure 8A:
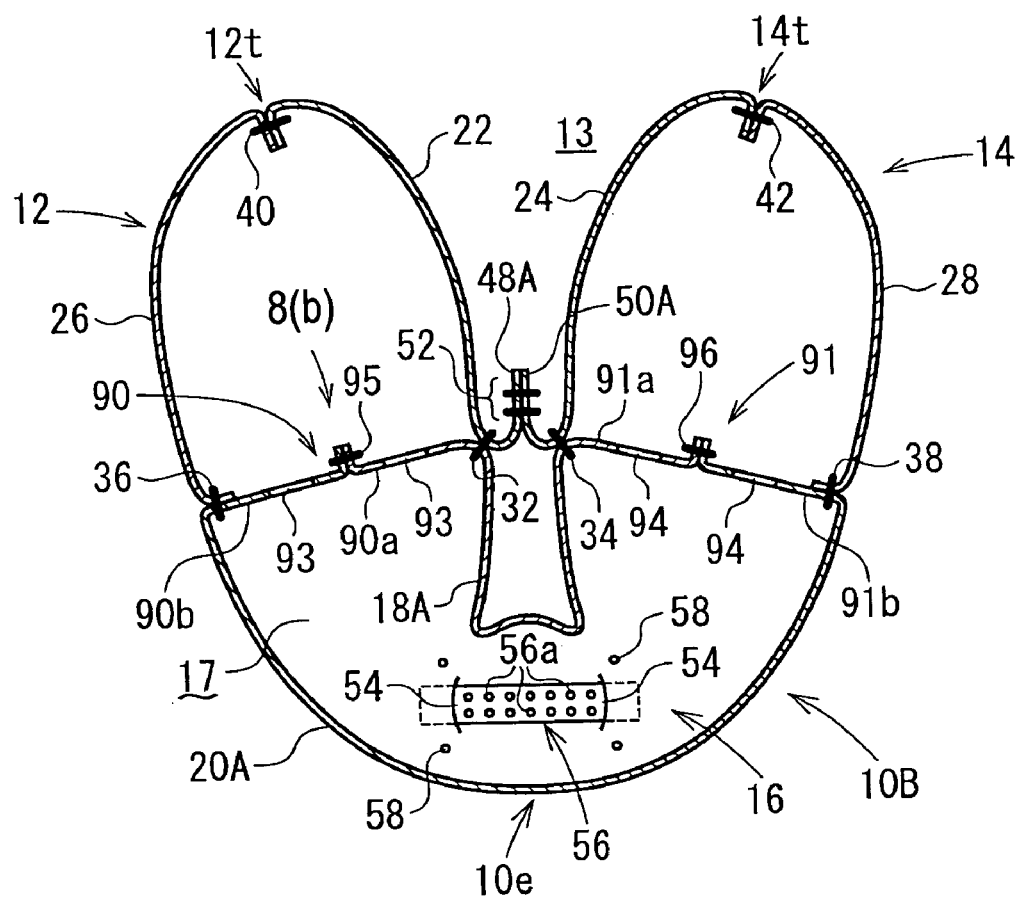
FIGS. 8(*a*) and 8(*b*) are views of an airbag according to a still further embodiment of the present invention, wherein FIG. 8(*a*) is a sectional view of the airbag, and FIG. 8(*b*) is an enlarged perspective view of a part 8(*b*) in FIG. 8(*a*)
Figure 8B:
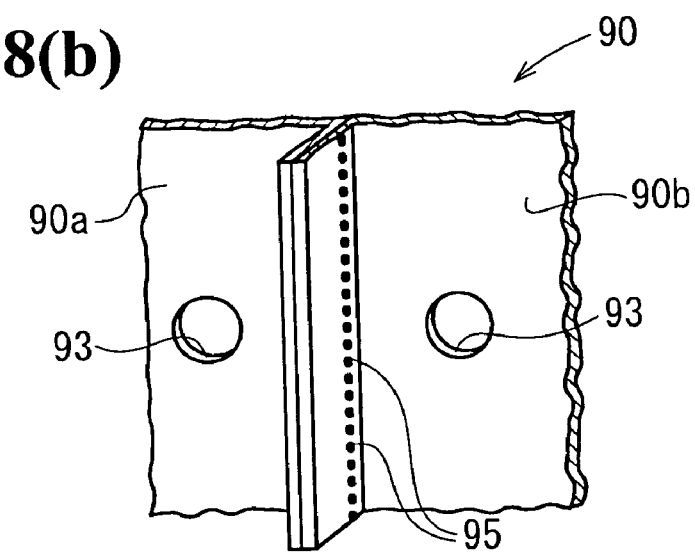

In the embodiments describe above, the partition panel is provided separately from the panels forming the outer shell of the airbag for dividing each of the left half airbag and the right half airbag into the base end portions and the front end portions. Alternatively, as shown in FIGS. 8(a) and 8(b), the panels forming the outer shell of the airbag and the partition panel may be integrated. FIG. 8(a) is a sectional view of an airbag 10B with such an arrangement similar to FIG. 1(b); and FIG. 8(b) is an enlarged perspective view of a part 8(b) in FIG. 8(a).

As shown in FIGS. 8(a) and 8(b), the airbag 10B includes the right half airbag 12 to be inflated on a front right side of the occupant, the left half airbag 14 to be inflated on a front left side of the occupant, and the communicating section 16 for communicating the base ends of the right half airbag 12 and the left half airbag 14 with each other. In this embodiment, the interior of the right half airbag 12 is partitioned into the base end portion and the front end portion by a partition panel 90, and the interior of the left half airbag 14 is partitioned into the base end portion and the front end portion by a partition panel 91.

The partition panel 90 has openings 93 for communicating the base end portion of the right half airbag 12 with the front end portion thereof. The partition panel 91 has openings 94 for communicating the base end portion of the left half airbag 14 with the front end portion thereof. The airbag 10B has an outer shell formed by stitching together a rear inner panel 18A forming a central surface of the airbag 10B including the respective base end portions of the right half airbag 12 and the left half airbag 14 and the communicating section 16; a rear outer panel 20A forming a surface opposed to the rear inner panel 18A; the front inner panels 22 and 24 forming the central surfaces of the airbag 10B at the respective front end portions of the right half airbag 12 and the left half airbag 14; and the front outer panels 26 and 28 forming surfaces opposite to the front inner panels 22 and 24.

Reference numerals 32 and 34 indicate seams stitching the rear inner panel 18A and the front inner panels 22 and 24 together, respectively. Reference numerals 36 and 38 denote seams stitching the rear outer panel 20A and the front outer panels 26 and 28 together, respectively.

In the embodiment, half panels 90a and 91a project from opposite ends of the rear inner panel 18A sewn to the front inner panels 22 and 24 with the seams 32 and 34, respectively. Also, half panels 90b and 91b project from opposite ends of the rear outer panel 20A sewn to the front outer panels 26 and 28 with the seams 36 and 38, respectively. The half panels 90a and 91a are integrated with the rear inner panel 18A, and the half panels 90b and 91b are integrated with the rear outer panel 20A.

The half panels 90a and 91a are disposed in the right half airbag 12, and the half panels 90b and 91b are disposed in the left half airbag 14. The openings 93 are provided in both of the half panels 90a and 90b, and the openings 94 are provided in both of the half panels 91a and 91b.

As shown in FIG. 8(a), ends of the half panels 90a and 90b are stitched together to form the partition panel 90 for dividing the interior of the right half airbag 12 into the base end portion and the front end portion. Similarly, ends of the half panels 91a and 91b are stitched together to form the partition panel 91 for dividing the interior of the left half airbag 14 into the base end portion and the front end portion. The airbag 10B is partitioned with the partition panels 90 and 91 into the respective base end portions of the right half airbag 12 and the left half airbag 14 and the base-end chamber 17 formed of the communicating section 16.

In the embodiment, connecting allowances 48A and 50A project from the respective ends of the front inner panels 22 and 24 sewn to the rear inner panel 18A with the seams 32 and 34, respectively. As shown in FIG. 8(a), the connecting allowances 48A and 50A are arranged on the exterior of the airbag 10B, and are stitched together with the seam 52 to join the intermediate portions of the right half airbag 12 and the left half airbag 14 in the direction of the inflation. Other arrangements of the airbag 10B are the same as those of the airbag 10 of FIGS. 1(a) to 4.

In the airbag 10B, the partition panels 90 and 91 for dividing the right half airbag 12 and the left half airbag 14 into the respective base end portions and the front end portions are integrated with the panels 18A and 20A forming the outer shell of the airbag 10B. Accordingly, it is possible to omit the partition panel, thereby reducing a cost of producing the airbag.

In the airbag 10B, when the inflator 56 is activated, the base-end chamber 17 is inflated first, and thereafter, the front end portions of the right half airbag 12 and the left half airbag 14 are inflated. The base-end chamber 17 contacts the instrument panel 1 to stabilize the base-end chamber 17. Therefore, the respective front end portions of the right half airbag 12 and the left half airbag 14 become stable in position not only after the inflation but also during the inflation.

In the airbag 10B, the right half airbag 12 and the left half airbag 14 are joined together at the intermediate portions thereof in the direction of the inflation. Therefore, when the right half airbag 12 and the left half airbag 14 inflate from the housed folded state, even if one of the half airbags is inflated faster than the other of the half airbags, the one of the half airbags starts to pull the other of the half airbags in the direction of the inflation at a relatively early stage during the inflation. Therefore, both of the right half airbag 12 and the left half airbag 14 are inflated smoothly and substantially symmetrically from the early stage of the inflation.

In the embodiment, the partition panels 90 and 91 are integrated with the rear inner panel 18A and the rear outer panel 20A. Alternatively, the partition panels 90 and 91 may be integrated with the other panels. The partition panels 90 and 91 are formed of two half panels 90a and 90b or 91a and 91b. Alternatively, the partition panels 90 and 91 may be formed of a one-piece panel.

As shown in FIG. 8(b), the openings 93 are formed in both of the half panels 90a and 90b consisting the partition panel 90. Alternatively, the openings 93 may be formed in only one of the half panels 90a and 90b. As shown in FIGS. 5(a), 5(b) and 6, the openings 93 may be closed with a tear seam or a patch to prevent the gas from flowing out from the base-end chamber 17 until the inner pressure of the base-end chamber 17 reaches a predetermined level during the inflation of the airbag. With such an arrangement, it is possible to inflate the base-end chamber 17 early.

Figure 9A:
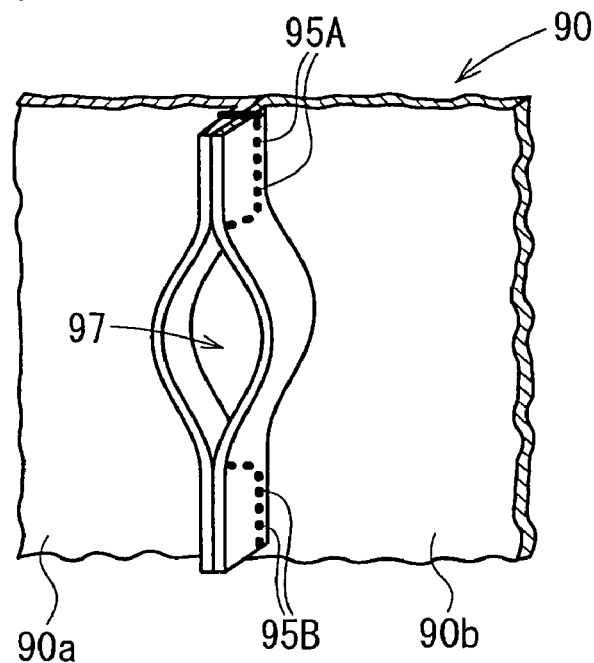
FIGS. 9(*a*) and 9(*b*) are views of a partition panel according to a still further embodiment, wherein FIG. 9(*a*) shows an opening of the partition panel in an open state, and FIG. 9(*b*) shows the opening of the partition panel in a closed state.

In place of the openings 93, as shown in FIG. 9(a), it is possible to stitch the ends of the half panels 90a and 90b together with noncontiguous seams 95A and 95B, thereby forming an opening 97 between the seams 95A and 95B. Accordingly, it is possible to omit a process of making openings in the half panels 90a and 90b.

Figure 9B:
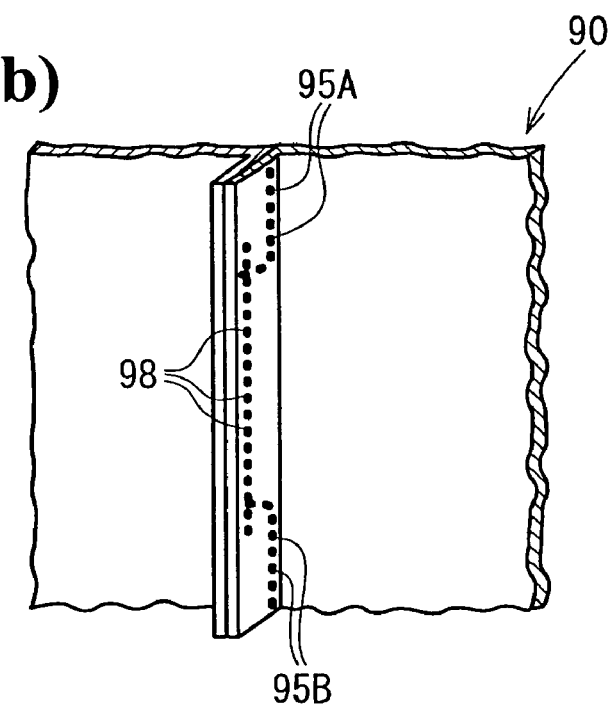

In such an arrangement, as shown in FIG. 9(b), the portion between the seams 95A and 95B may be stitched together with a tear seam 98 to close the opening 97 until the inner pressure of the base-end chamber 17 reaches a predetermined level during the inflation of the airbag. The opening 97 may be closed with a removable adhesive such as the adhesive 82 or other various bonding means in place of the tear seam 98.

FIGS. 9(a) and 9(b) are views of the opening similar to that shown in FIG. 8(b), wherein FIG. 9(a) shows the opening in an open state; and FIG. 9(b) shows the opening in a closed state. It is obvious that the arrangement of the partition panel 90 can be applied to the partition panel 91.

In the embodiments described above, the respective base end portions and front end portions of the left half airbag and the right half airbag are integrated, and the partition panels are provided in the left half airbag and the right half airbag to divide the same into the base end portions and the front end portions. Alternatively, as shown in an airbag 10C in FIGS. 10(a), 10(b) and 11, the respective base end portions and front end portions of the left half airbag and the right half airbag may be separately formed in advance and then joined to each other.

Figure 10A:
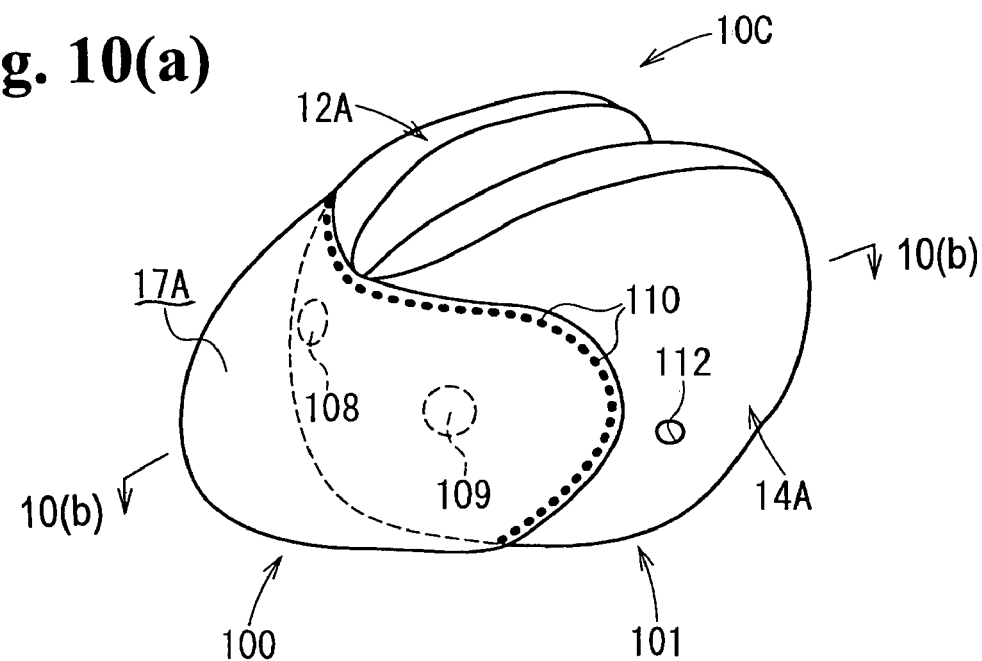
FIGS. 10(*a*) and 10(*b*) are views of an airbag according to a still further embodiment of the present invention, wherein FIG. 10(*a*) is a perspective view of the airbag, and FIG. 10(*b*) is a sectional view of the airbag taken along line 10(*b*)—10(*b*) in FIG. 10(*a*)
Figure 10B:
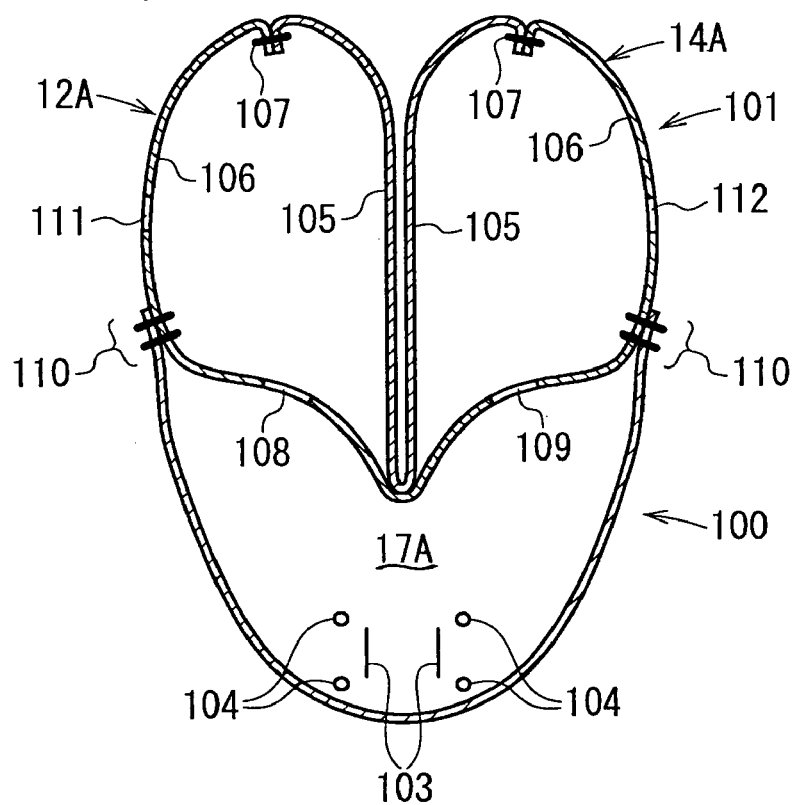
Figure 11:
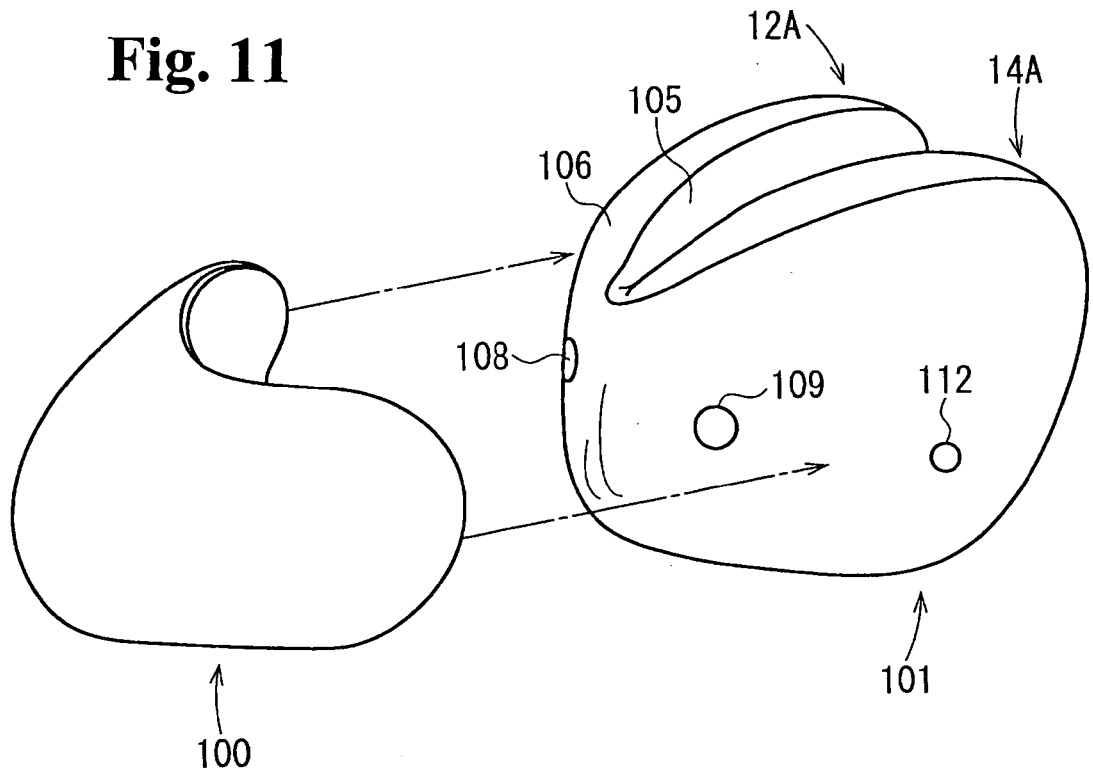
FIG. 11 is an exploded perspective view of the airbag shown in FIG. 10(*a*)

FIG. 10(a) is a perspective view of the airbag 10C with such an arrangement, and FIG. 10(b) is a sectional view of the airbag 10C taken along line 10(b)—10(b) in FIG. 10(a). FIG. 11 is an exploded perspective view of the airbag 10C The airbag 10C includes a right half airbag 12A to be inflated on a front right side of the occupant, a left half airbag 14A to be inflated left on a front left side of the occupant, and respective base ends thereof communicating with each other.

The airbag 10C is formed by joining a rear-side airbag 100 forming the base end portions of the right half airbag 12A and the left half airbag 14A with a front-side airbag 101 forming the respective front end portions of the right half airbag 12A and the left half airbag 14A. The rear-side airbag 100 and the front-side airbag 101 are separately made in advance when the airbag 10C is produced.

The rear-side airbag 100 is formed in a substantially circular-truncated-cone-shape with an opening at an end having a larger diameter (front end). An internal space of the rear-side airbag 100 is a base-end chamber 17A. The rear-side airbag 100 has a pair of slits 103 in a lower surface of the base end of the rear-side airbag 100. A rod-like inflator (not shown) is inserted into the slits 103 to pass through the base-end chamber 17A along the width of the vehicle. Reference numeral 104 indicates holes for inserting a fastener (not shown) such as bolts for connecting the rear end of the rear-side airbag 100 with the casing (not shown) of the airbag system.

The front-side airbag 101 is formed in a bag shape by superposing an inner panel 105 forming a central surface of the airbag at the respective front end portions of the right half airbag 12A and the left half airbag 14A on an outer panel 106 opposite to the inner panel 105 and stitching the peripheries thereof together. Reference numeral 107 represents a seam stitching the inner panel 105 and the outer panel 106 together. The respective front-end chambers of the right half airbag 12A and the left half airbag 14A are formed between the inner panel 105 and the outer panel 106, and are connected with each other.

The front-side airbag 101 is folded in two at an intermediate portion in the lateral direction. The folded portion forms the base end of the respective front-end chambers of the right half airbag 12A and the left half airbag 14A. The outer panel 106 has a pair of openings 108 and 109 arranged on both sides of the folded portion. The opening 108 faces the front-end chamber of the right half airbag 12A, and the opening 109 faces the front-end chamber of the left half airbag 14A.

The base end (folded portion) of the front-side airbag 101 is fitted in the end opening of the rear-side airbag 100 so that the openings 108 and 109 face the base-end chamber 17A. The periphery of the end opening is sewn to an outer surface of the outer panel 106 of the front-side airbag 101. The base-end chamber 17A communicates with the front end portion of the right half airbag 12A and the front end portion of the left half airbag 14A through the openings 108 and 109, respectively.

In other words, in the airbag 10C, the outer panel 106 acts as a partition wall for dividing the respective base end portions of the right half airbag 12A and the left half airbag 14A from the front end portions thereof.

The outer panel 106 has vent holes 111 and 112 for discharging the gas in the respective front-end chambers of the right half airbag 12A and the left half airbag 14A to the exterior. In the airbag 10C, an inflator is disposed in the base-end chamber 17A through the slits 103. When the inflator is activated to emit the gas, the gas from the inflator first inflates the base-end chamber 17A and then flows into the respective front-end chambers of the right half airbag 12A and the left half airbag 14A through the openings 108 and 109 to inflate them, respectively. The base-end chamber 17A contacts the component of the vehicle such as the instrument panel, thereby being stable in position. Therefore, the front end portions of the right half airbag 12A and the left half airbag 14A are stable in position not only after the inflation but also during the inflation.

In the embodiments described above, the left half airbag and the right half airbag have a substantially equal volume. Alternatively, the left half airbag and the right half airbag may have different volumes. When the left half airbag and the right half airbag have different volumes, the openings for communicating the respective base end portions of the left half airbag and the right half airbag with the front end portions are made such that the opening of the larger-volume bag is larger. With such an arrangement, the left half airbag and the right half airbag having different volumes can be inflated at substantially the same time.

Figure 12:
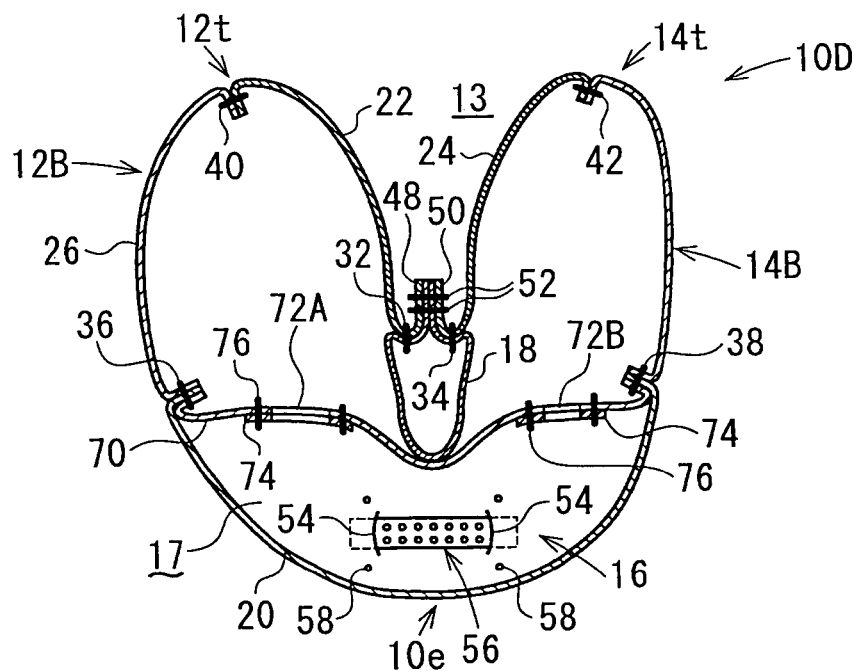
FIG. 12 is a sectional view of an airbag according to a still further embodiment of the present invention.

FIG. 12 is a sectional view of an airbag 10D with such an arrangement, showing a part similar to that in FIG. 1(*b*). In the airbag 10D in FIG. 12, a right half airbag 12B has a volume larger than that of a left half airbag 14B. An opening 72A communicating the front end portion of the right half airbag 12B with the base-end chamber 17 has a size larger than that of an opening 72B communicating the front end portion of the left half airbag 14B with the base-end chamber 17. Other arrangements of the airbag 10D are the same as those of the airbag 10 of FIGS. 1(*a*) to 4.

In the airbag 10D, when the inflator 56 is activated to inflate the base-end chamber 17 with the gas from the inflator 56, the gas in the base-end chamber 17 flows into the right half airbag 12B and the left half airbag 14B through the openings 72A and 72B, respectively. At this time, the gas passes through the opening 72A in a larger amount than the gas passing through the opening 72B. Accordingly, the left half airbag 14B and the right half airbag 12B are inflated substantially at the same time.

Figure 13:
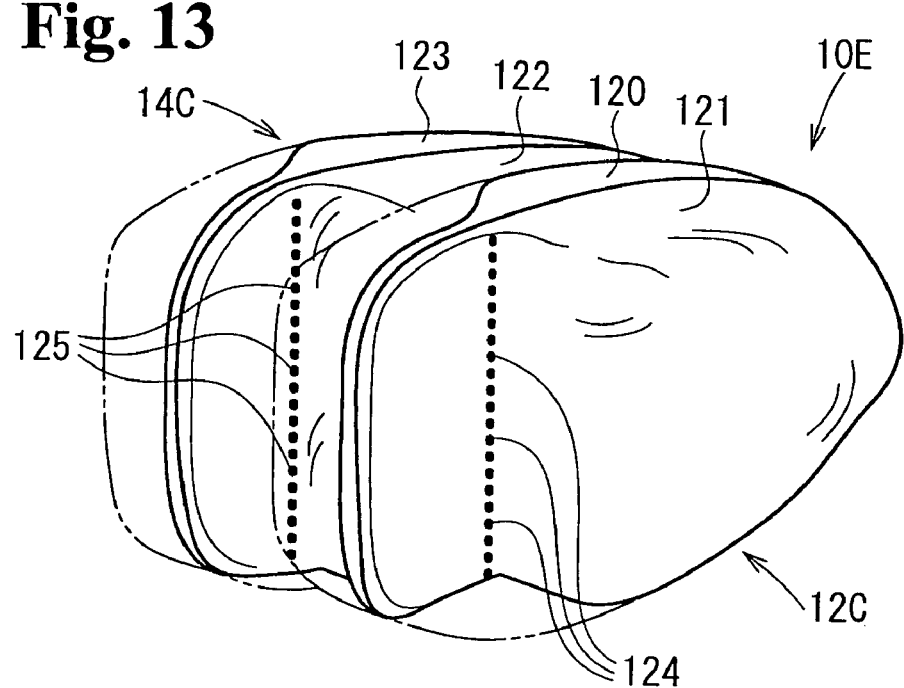
FIG. 13 is a perspective view of an airbag according to a still further embodiment of the present invention.

FIG. 13 is a perspective view of an airbag 10E according to a further embodiment of the invention. The airbag 10E includes a right half airbag 12C to be inflated on a front right side of the occupant, a left half airbag 14C to be inflated on a front left side of the occupant, and respective base ends thereof communicating with each other. An inflator (not shown) is disposed in the communicating part of the base ends. The left and right sides of the right half airbag 12C are formed of an inner panel 120 and an outer panel 121. The left and right sides of the left half airbag 14C are also formed of an inner panel 122 and an outer panel 123.

In the embodiment, the right half airbag 12C and the left half airbag 14C are partitioned into the base end portions and the front end portions by stitching the panels 120 and 121 and the panels 122 and 123 together with tear seams 124 and 125, respectively, in the middle between the respective base end portions and the respective front end portions (at intermediate portions in the direction of the inflation).

The tear seams 124 and 125 extend from upper ends of the right half airbag 12C and the left half airbag 14C to lower ends thereof, respectively. The respective stitched parts of the panels 120 and 121 and the panels 122 and 123 with the seams 124 and 125 block the gas from flowing between the respective base end portions of the right half airbag 12C and the left half airbag 14C and the front end portions thereof.

When the inner pressure of the base-end chambers of the right half airbag 12C and the left half airbag 14C reaches a predetermined level, the tear seams 124 and 125 are torn to open by the tension separating the panel 121 from the panel 122 and the panel 122 from the panel 123 to separate the panels 120 and 121 and the panels 122 and 123.

In the airbag 10E with such an arrangement, when the inflator is activated in case of a car crash, the gas from the inflator first inflates the respective base ends of the right half airbag 12C and the left half airbag 14C. Thereafter, when the inner pressure of the base-end chambers reaches a predetermined level, the tear seams 124 and 125 are torn to open, so that the gas flows into the respective front-end chambers of the right half airbag 12C and the left half airbag 14C to inflate them.

In the airbag 10E, the base ends of the right half airbag 12C and the left half airbag 14C contact a component of the vehicle such as an instrument panel, thereby being stable in position. Therefore, the respective front end portions of the right half airbag 12C and the left half airbag 14C become stable in position not only after the inflation but also during the inflation.

In the airbag 10E, the gas is blocked between the respective base end portions and front end portions of the right half airbag 12C and the left half airbag 14C until the inner pressure of the base-end chambers reaches a predetermined level, i.e. the tear seams 124 and 125 are torn to open. Accordingly, the gas from the inflator is substantially supplied only to the base-end chambers, so that the base-end chambers inflate very early.

In the embodiment, the panels 120 and 121 of the right half airbag 12C and the panels 122 and 123 of the left half airbag 14C are stitched together with the tear seams 124 and 125, respectively, so that the right half airbag 12C and the left half airbag 14C are each partitioned into the base end portions and the front end portions. The way of partitioning the right half airbag 12C and the left half airbag 14C into the respective base end portions and front end portions is not limited to that.

Figure 14:
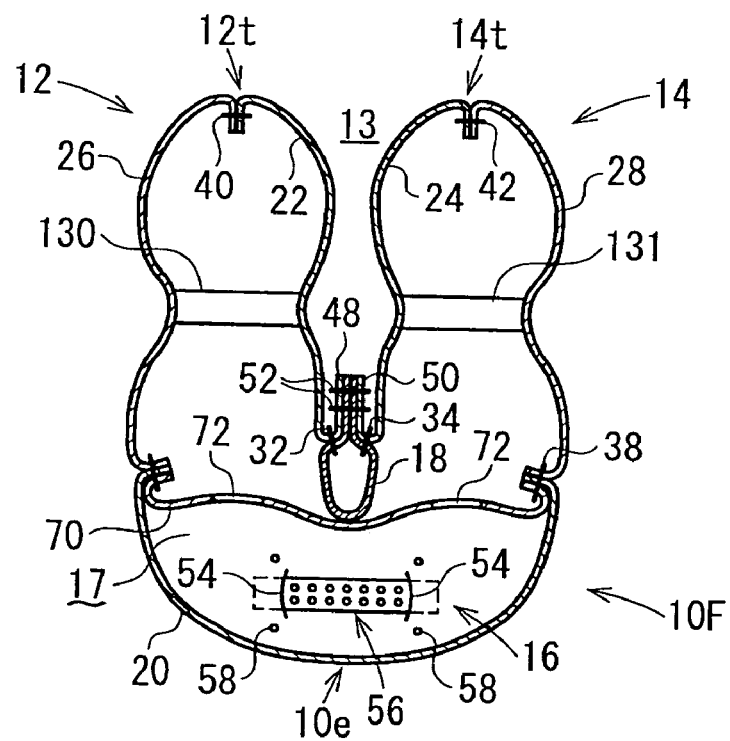
FIG. 14 is a sectional view of an airbag according to a still further embodiment of the present invention.

As shown in an airbag 10F in FIG. 14, means may be provided for restricting the lateral widths of the left half airbag and the right half airbag during the inflation. When the widths of the left half airbag and the right half airbag are restricted, the volume of the entire airbag is reduced during the inflation, thereby allowing even a low-output inflator to inflate the airbag early.

FIG. 14 is a sectional view of the airbag 10F with such an arrangement, showing a part similar to that in FIG. 1(*b*). The airbag 10F includes the right half airbag 12 to be inflated on a front right side of the occupant, the left half airbag 14 to be inflated on a front left side of the occupant, and the communicating section 16 for communicating the respective base ends of the right half airbag 12 and the left half airbag 14 with each other. The partition panel 70 partitions the interior of the right half airbag 12 and the interior of the left half airbag 14 into the respective base end portions and front end portions. The partition panel 70 has the openings 72 for communicating the base end portions of the right half airbag 12 and the left half airbag 14 with the front end portions thereof, respectively.

A connecting belt 130 is disposed in the right half airbag 12 for connecting the front inner panel 22 and the front outer panel 26 forming the left and right sides of the front end portion of the right half airbag 12. A connecting belt 131 is disposed in the left half airbag 14 for connecting the front inner panel 24 and the front outer panel 28 forming the left and right sides of the front end portion of the left half airbag 14.

The connecting belts 130 and 131 prevent the front inner panels 22 and 24 from separating from the front outer panels 26 and 28, respectively, by lengths longer than the connecting belts 130 and 131. Accordingly, the connecting belts 130 and 131 restrict the widths of the right half airbag 12 and the left half airbag 14 during the inflation. Other arrangements of the airbag 10F are the same as those of the airbag 10 of FIGS. 1(a), 1(b) to 4.

In the airbag 10F, the connecting belts 130 and 131 restrict the widths of the right half airbag 12 and the left half airbag 14 during the inflation, so that the volume of the entire airbag 10F is reduced during the inflation. Therefore, the airbag 10F can be inflated early even with a relatively small-output inflator.

In the embodiment, the connecting belts are provided as means for restricting the widths of the right half airbag 12 and the left half airbag 14 during the inflation. The means for restricting the widths is not limited to that.

The embodiments described above are only examples of the present invention, and the invention is not limited to the embodiments illustrated. For example, the embodiments have the left half airbag and the right half airbag connected at the base ends thereof. Alternatively, they may be separated. The left half airbag and the right half airbag may be inflated by different inflators. The intermediate portions between the left half airbag and the right half airbag may be joined together with a panel, a cord, or a net.

The left half airbag and the right half airbag may have symmetry shapes or asymmetry shapes. The left half airbag and the right half airbag may have an equal volume or different volumes.

Figure 15:
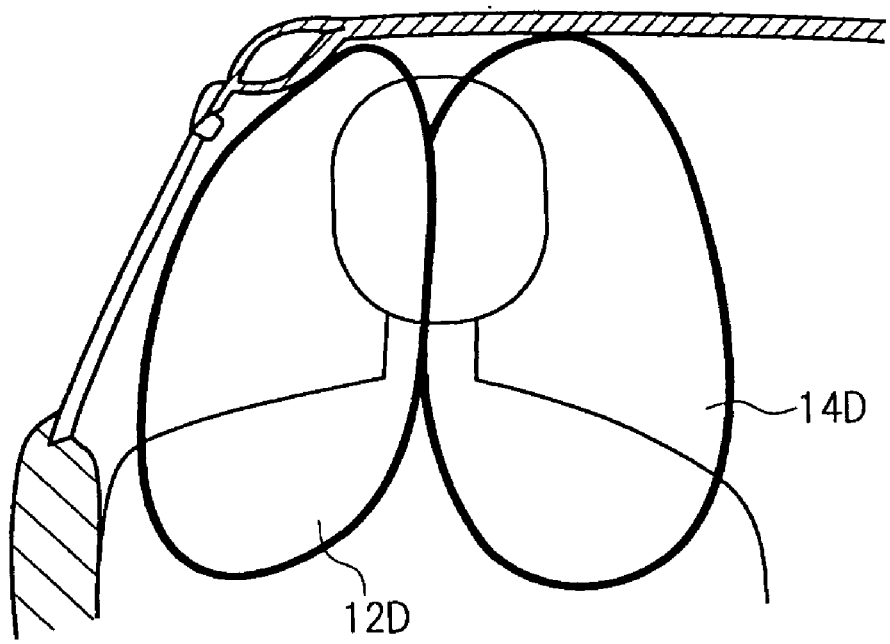
FIG. 15 is a view of an airbag according to a still further embodiment of the present invention.

According to the invention, as shown in FIG. 15, an airbag (a right half airbag 12D in FIG. 15) to be disposed adjacent to an A pillar may be arranged such that an upper part is inclined along the vehicle chamber so as not to contact the A pillar, a windshield, and a side window as much as possible.

Figure 16:
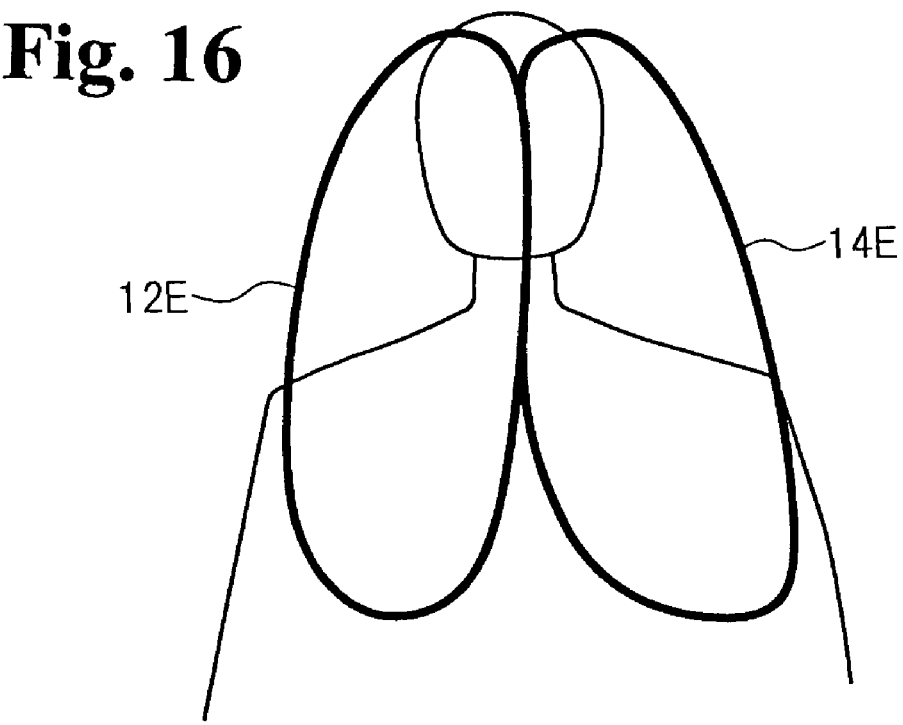
FIG. 16 is a view of an airbag according to a still further embodiment of the present invention.

According to the invention, as shown in FIG. 16, each of airbags (a left half airbag 14E and a right half airbag 12E in FIG. 16) may have a lateral width gradually decreasing upward.

As described above, the invention provides the airbag and the airbag system in which the base end portion thereof is inflated earlier than the front end portion thereof. According to the invention, when the airbag is inflated, the left half airbag receives the left thorax of an occupant and the right half airbag receives the right thorax. The space between the half airbags faces the vicinity of the breastbones of the occupant. According to the present invention, the airbag is partitioned into the base end portion and the front end portion. The base end portion is inflated earlier than the front end portion. Furthermore, according to the present invention, both of the left half airbag and the right half airbag are inflated smoothly and substantially symmetrically from the early stage of the inflation.

While the invention has been explained with reference to the specific embodiments of the invention, the explanation is illustrative and the invention is limited only by the appended claims.

What is claimed is:

1. An airbag for protecting an occupant, comprising:
   a left half airbag to be inflated on a front left side of the occupant and having a left base end portion and a left front end portion,
   a right half airbag to be inflated on a front right side of the occupant and having a right base end portion and a right front end portion,
   partitioning means disposed in the airbag for partitioning the left half airbag into the left base end portion and the left front end portion, and the right half airbag into the right base end portion and the right front end portion, and
   opening means formed in the partitioning means for communicating each of the base end portion and the front end portion of the left and right half airbags.

2. An airbag according to claim 1, wherein said partition means includes a partitioning wall, and said opening means includes openings formed in the partitioning wall.

3. An airbag according to claim 2, wherein one of said left half airbag and right half airbag has a capacity larger than that of the other of the left half airbag and right half airbag, and one of said openings in the partition wall communicating with the one of the left half airbag and right half airbag has an area larger than that of the other of the openings.

4. An airbag according to claim 2, further comprising closing means for closing the openings in the partition wall until a gas pressure in the base end portion reaches a predetermined level.

5. An airbag according to claim 4, wherein said closing means includes a tear seam.

6. An airbag according to claim 2, wherein said partition wall has a lower part and an upper part, said lower part being located away from a base end of the airbag more than the upper part.

7. An airbag according to claim 1, wherein said opening means opens when a gas pressure of each of the base end portions reaches a predetermined level.

8. An airbag according to claim 7, wherein said partitioning means is a tear seam.

9. An airbag according to one of claim 1, wherein said left half airbag and right half airbag have front ends spaced apart from each other so that a space facing the occupant is formed between the front ends of the left half airbag and the right half airbag when the airbag is inflated.

10. An airbag according to claim 1, wherein said left and right base end portions communicate with each other so that the left half airbag and the right half airbag are inflated by a common inflator.

11. An airbag according to claim 1, wherein said left half airbag and said right half airbag are connected together at intermediate portions thereof in a direction that the airbag is inflated.

12. An airbag according to claim 1, further comprising restricting means attached to the airbag for restricting widths of the left half airbag and right half airbag when the airbag is inflated.

13. An airbag according to claim 1, wherein said base end portion is arranged so that the base end portion is inflated toward the occupant along an upper surface of an instrument panel, and has a lower front end projecting from a rim of the upper surface of the instrument panel when the airbag is inflated.

14. An airbag system comprising the airbag according to claim 1 and an inflator for inflating the airbag.

15. An airbag according to claim 1, wherein at least one of said left half airbag and said right half airbag includes an inclined upper portion.

16. An airbag according to claim 1, wherein at least one of said left half airbag and said right half airbag includes a portion having a thickness gradually decreasing upwardly when the left half airbag and the right half airbag are inflated.

17. An airbag according to claim 1, wherein said distal ends of the left half airbag and the right half airbag are separated by a distance of 150–350 mm when the left half airbag and the right half airbag are deployed.

* * * * *